May 13, 1947.   W. C. GRABAU   2,420,312
FREQUENCY REGULATOR
Filed Feb. 16, 1945

INVENTOR.
WILLIAM C. GRABAU
BY
HIS ATTORNEY

Patented May 13, 1947

2,420,312

UNITED STATES PATENT OFFICE 2,420,312

FREQUENCY REGULATOR

William C. Grabau, Brighton, Mass., assignor, by mesne assignments, to Submarine Signal Company, Boston, Mass., a corporation of Delaware Application February 16, 1945, Serial No. 578,181

6 Claims. (Cl. 290—40)

The present invention relates to a regulating device for fuel-fed engines driving an electric generator where the load may be taken from the generator end of the system. Mechanical centrifugal governors have commonly been used for this purpose with the view of maintaining the engine shaft speed constant.

In the present system regulation is obtained and maintained by means of an electrical control circuit which may be used both for maintaining constant speed and any desired adjusted speed. In my prior United States Patent No. 2,329,195 a system is disclosed for controlling the frequency in a motor generator system by regulation of the current in the field circuits. The present device does not lend itself readily to application of the means therein disclosed since the frequency of the system of the types herein discussed must be controlled through the rotational velocity of the prime mover. In the present system this is obtained by the use of a frequency control circuit employing changes in voltages produced principally by frequency changes which voltage changes are made to react quickly in controlling the speed of the prime mover. The combination is one of electrical and mechanical interaction and works with such rapidity that for sudden changes of load from no-load to full-load, or vice versa, the transient drop in frequency during correction is no greater than one cycle and for gradual changes the frequency may be maintained at the desired value within a range of $\frac{1}{10}$ of a cycle. With an accurate set up the desired frequency may be maintained with even narrower variations.

The present invention is principally applied to power systems and finds great application for the ordinary power supply of 25 cycles, 30 cycles, 60 cycles and 100 cycles and the like.

Figure 1:
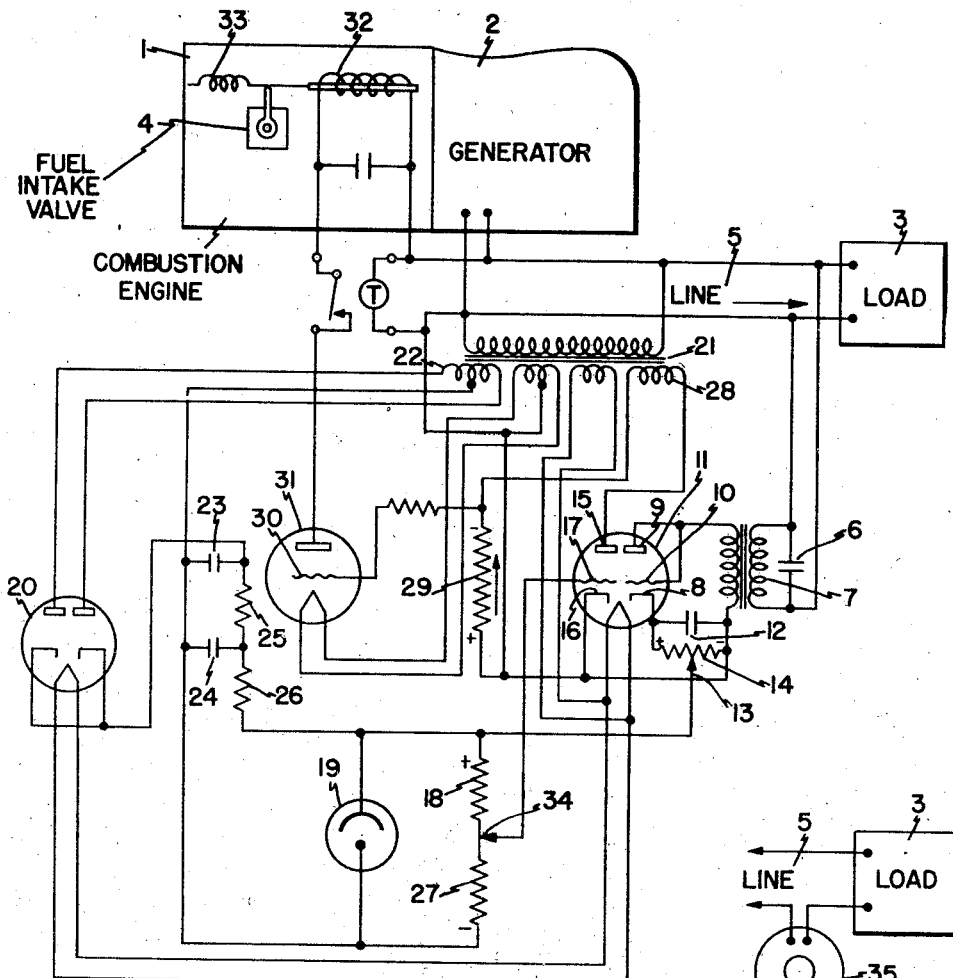
Figure 2:
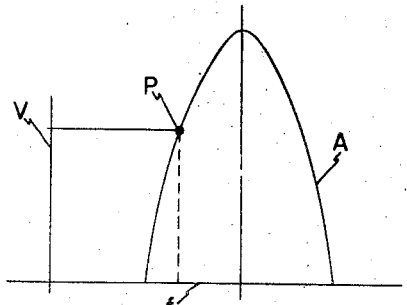
Figure 3:
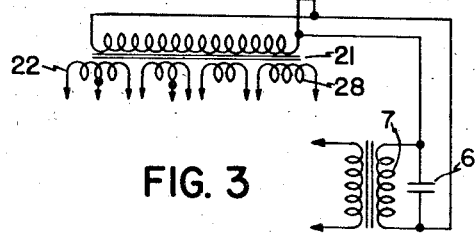

The invention will be more fully described in connection with the drawings illustrating the embodiment of the same in which Fig. 1 shows a schematic diagram of the invention, Fig. 2 illustrates the detail of operation thereof and Fig. 3 shows a modification of the arrangement of Fig. 1.

In the arrangement indicated in Fig. 1, a combustion engine 1 is shown driving an electric generator 2 which supplies electric power to a load 3 at some usually employed frequency as, for instance, 60 cycles or some frequency in that range. The combustion engine may be of a gas or Diesel type or any other device in which there is provided a fuel-intake valve 4 by which the supply of fuel may be regulated. In general if the fuel-intake valve is opened wider, the speed of the generator 2 will be increased and thereby the frequency will be raised. If the valve is operated in the opposite direction, the speed of the generator will decrease and therefore its frequency. In the further detail of the arrangement of Fig. 1 the line 5 supplying the load 3 has a resonant circuit 6 connected across it, the resonance curve of which is shown in Fig. 2 by the curve A.

This resonant circuit is so adjusted that the normal frequency of operation is on the left side of the curve A at a point as illustrated at P in which for a decrease in frequency a voltage drop is produced across the transformer 7. A decrease in frequency of perhaps one cycle may reduce the voltage across the coil 7 three volts or more whereas a drop of line voltage which may accompany the reduction of frequency would, of course, not be amplified across the coil 7 since the coil is across the line. The transformation ratio in the transformer 7 may be and preferably is a one to one ratio.

This alternating current voltage is rectified in the rectifier circuit comprising a cathode 8, the anode 9 and the grid 10 which is tied to the anode 9, all to be found in a vacuum tube 11 which may be of the thermionic type as, for instance, the tube commercially designated as 6SL7GT. The voltage drop in the resistor 12 corresponds to and is a function of the alternating voltage appearing across the coil 7. An adjustable tap lead 13 may be applied to the resistor 12 for adjustment of the voltage which is desired to be taken off the resistor 12 for the proper frequency to be maintained, as will be more clearly seen later.

It will be seen from the description to follow that the voltage drop across that portion 14 of the resistor 12 is in series with the grid control circuit of the other half of the thermionic tube 11 which has an anode 15, a cathode 16 and a control grid 17. The voltage across the portion 14 is connected in series opposing with the voltage across the element 18 which is a portion of a standard voltage developed across the voltage regulator tube 19 through the full-wave rectifier 20. This standard voltage provides the differential by which the control is established. The transformer 21 which has a secondary coil 22 provides, through the full-wave rectifier 20, a rectified direct current source through the rectifier circuit including the condensers 23 and 24 and the impedances 25 and 26. The voltage regulator tube 19 is such that a constant voltage is developed across the output of the tube 19 across which the impedances 18 and 27 are shunted in series with each other.

The potential supplied between the cathode 16 and the anode 15 in the thermionic tube 11 is obtained through the secondary 28 of the transformer 21 and the bias established on the control grid 17 is that of the impedance or resistance 18 connected partly across the voltage regulator tube 19 and the portion 14 of the drop across the resistance 12. The voltage supplied by the portion 14 may be positive and that supplied by the portion 18 negative in the grid control circuit.

Under these conditions when the positive voltage in 14 decreases as is the case when the frequency drops, then the grid 17 will become more negative and tend to cut down the drop in the resistance 29 applied to the grid 30 of the gaseous conduction tube 31 so that this tube becomes more conductive and acts on the solenoid 32 to open further the fuel-intake valve 4, thus bringing up the speed of the generator and restoring the frequency to the point P on the operating resonance characteristic A of Fig. 2. With the increase in speed of the generator 2 the voltage generated across the coil 7 increases and therefore the positive bias on the grid 17 to re-establish the drop in the resistor 29 and cut down the current supplied to the coil 32. The fuel intake valve may have an internal spring or an external spring as indicated at 33 to balance the solenoid pull. Adjustment for regulation for desired frequencies may be obtained by adjusting the position of the tap 13 or by adjusting the position of the connection 34 between the resistances 18 and 27 either towards one or the other of these resistances.

In Fig. 3 a modification of the manner in which the regulator is connected to the line is shown. Instead of connecting the resonating circuit directly across the line as in Fig. 1, a current transformer 35 is used which is substantially independent of the voltage developed across the system. The voltage across the secondary of the current transformer 35 is always about the same and the frequency alone brings about the voltage change in the resonating current. The secondary of 35 also energizes the rest of the circuit used in Fig. 2, the transformer 21 being connected across it.

Without further describing my invention, I claim:

1. Means for regulating the frequency in an electric power system having a prime mover and an electric generator comprising a frequency resonant circuit operatively connected across the generator, means for rectifying the voltage developed in said resonant circuit, a thermionic control tube and circuit having anode cathode and control electrodes, means for developing a standard constant direct current voltage from said generator, means impressing portions of said standard voltage and said rectified voltage in series opposition on said control grid, a gaseous control tube having anode, cathode and grid control electrodes, means operatively connected to the output of said thermionic control tube for controlling the discharge of said gaseous control tube, and means operative by said gaseous control tube to control the speed of the prime mover for regulating the generator frequency.

2. Means for regulating the frequency in an electric power system having a prime mover and an electric generator comprising a frequency resonant circuit operatively connected across the generator, means for rectifying the voltage developed in said resonant circuit, a thermionic control tube and circuit, means comprising a standard voltage and said rectified voltage in series opposition operatively connected for controlling the operation of said thermionic control tube and circuit, and electromechanical means operatively controlled by said thermionic control tube and circuit for controlling the speed of the prime mover whereby the frequency of the generator is maintained at the desired value.

3. Means for regulating the frequency in an electric power system having a prime mover and an electric generator comprising a frequency resonant circuit operatively connected across the generator, means for rectifying the voltage developed in said resonant circuit, a thermionic control tube and circuit, means comprising a standard voltage and said rectified voltage in series opposition operatively connected for controlling the operation of said thermionic control tube and circuit, a gaseous conduction tube operatively controlled by said thermionic control tube and electromechanical means energized by the operation of said conduction tube to control the speed of the prime mover whereby the frequency of the generator is maintained at the desired value.

4. Means for regulating the frequency in an electric power system having a prime-mover and an electric generator comprising a frequency resonant circuit operatively connected across the generator, the normal frequency of the generator being on the slope of the resonance wherein voltage and frequency change in the same directions, means for rectifying the voltage developed in said resonant circuit, means comprising a standard voltage and said rectified voltage in series opposition operatively connected for controlling the operation of said thermionic control tube and circuit whereby a decrease in magnitude of the rectified voltage will cause a decrease in current said thermionic control tube and circuit, a gaseous conduction tube operatively connected to said thermionic control tube and circuit and operative upon a decrease of current in said thermionic control tube, and electromechanical means energized by the operation of said conduction tube to increase the speed of the prime mover whereby the frequency of the generator is maintained at the desired value.

5. Means for regulating the frequency in an electric power system having a prime mover and an electric generator comprising a current transformer connected in the output of the electric generator, a frequency resonant circuit operatively connected across said current transformer, a voltage regulator circuit operatively controlled by the output voltage of said resonant circuit and electromechanical means operatively connected to said voltage regulator circuit for controlling the speed of the prime mover whereby the frequency of the generator is maintained at the desired value.

6. Means for regulating the frequency in an electric power system having a prime mover and an electric generator comprising a current transformer connected in the output line of said generator, a frequency resonant circuit connected across said current transformer, means for rectifying the voltage developed in said resonant circuit, a thermionic control tube and circuit, a constant direct voltage source operatively energized through the secondary of said current transformer and proving a standard voltage, means comprising said standard voltage and the rectified voltage developed from said resonant circuit connected in series opposition for controlling the operating of said thermionic control tube and circuit, and electromechanical means operatively controlled by said thermionic control tube and circuit for controlling the speed of the prime mover whereby the frequency of the generator is maintained at the desired value.

WILLIAM C. GRABAU.

REFERENCES CITED

The following references are of record in the file of this patent:

UNITED STATES PATENTS

| Number | Name | Date |
|---|---|---|
| 1,872,243 | Churcher | Aug. 16, 1932 |
| 2,151,127 | Logan et al. | Mar. 21, 1939 |
| 1,873,981 | Rump | Aug. 30, 1932 |
| 1,948,591 | Morgan | Feb. 27, 1934 |
| 1,958,596 | Stuller | May 15, 1934 |
| 2,037,696 | Burt | Apr. 21, 1936 |
| 2,329,195 | Grabau | Sept. 14, 1943 |